(12) United States Patent  
Romantini

(10) Patent No.: US 7,790,642 B2
(45) Date of Patent: Sep. 7, 2010

(54) WATERPROOF SHEET AND A PROCESS FOR THE MANUFACTURING THEREOF

(75) Inventor: Alfredo Romantini, Monguzzo (IT)

(73) Assignee: Freudenberg Politex S.R.L., Milan (IT)

( * ) Notice: Subject to any disclaimer, the term of this patent is extended or adjusted under 35 U.S.C. 154(b) by 80 days.

(21) Appl. No.: 12/086,891

(22) PCT Filed: Dec. 27, 2006

(86) PCT No.: PCT/EP2006/070221

§ 371 (c)(1),
(2), (4) Date: Jun. 20, 2008

(87) PCT Pub. No.: WO2007/077182

PCT Pub. Date: Jul. 12, 2007

(65) Prior Publication Data

US 2009/0011196 A1    Jan. 8, 2009

(30) Foreign Application Priority Data

Jan. 3, 2006    (IT) .......................... MI2006A0006

(51) Int. Cl.
*B32B 27/12*    (2006.01)
*D04H 3/16*    (2006.01)

(52) U.S. Cl. ...................................... 442/394; 442/401

(58) Field of Classification Search ................. 442/394, 442/401, 395–399

See application file for complete search history.

(56) References Cited

U.S. PATENT DOCUMENTS 5,266,390 A  *  11/1993  Garland ....................... 428/216
6,100,208 A     8/2000   Brown et al.

OTHER PUBLICATIONS

International Search Report mailed Apr. 27, 2007 for International Application No. PCT/EP2006/070221.
Written Opinion of the International Searching Authority mailed Apr. 27, 2007 for International Application No. PCT/EP2006/070221.

* cited by examiner

*Primary Examiner*—Lynda Salvatore
(74) *Attorney, Agent, or Firm*—Wenderoth, Lind & Ponack, L.L.P.

(57) ABSTRACT

A waterproof sheet which allows for better adhesion between multiple waterproof sheets, the sheet including at least one layer of waterproof material arranged between a first and a second layer of spunbonded fabric, the layers of spunbonded fabric having a surface covered by waterproof material and being laterally offset one with respect to the other so as to have a projection of the first layer with respect to the second layer on one side and a projection of the second layer with respect to the first layer on the opposite side.

17 Claims, 2 Drawing Sheets

WATERPROOF SHEET AND A PROCESS FOR THE MANUFACTURING THEREOF

BACKGROUND OF THE INVENTION

The present invention relates to a waterproof sheet and a process for the manufacturing thereof.

Waterproof products employed when a protection from water is needed, are known in the state of the art; some of said products are, for example, bituminous membranes, sheets made of PVC, sheets made of rubber, etc.

Bituminous membranes are manufactured by immersing frameworks, among which are polyester spunbonded fabrics, in a bath of bituminous mixture which is warm enough to obtain, after cooling, rolls displaying a height of approximately 1 meter, a length of approximately 10 meters and a weight varying from 350 g/sqm to 5 kg/sqm and greater. The laying occurs by unwinding the roll of membrane on the surface to waterproof, inducing it to adhere mainly by means of flame-hardening of the back with a flame blow-pipe, in order for the slightly molten part to attach to the surface. Another membrane roll is unwound in parallel to the first one taking care to overlap it by a width of at least 5 cm. The overlapping part is flame-hardened and pressed along the contact line in order to link the two layers of membrane. The critical part is the junction area between the rolls, which may allow the penetration of water if not properly manufactured.

The membranes made of PVC are synthetic sheets obtained by extrusion of "polyvinil chloride" polymer. Generally commercially available rolls have a height even taller than one meter, lengths of 15-20 m and different thicknesses. The roll is stretched out on the surface and another roll is stretched out in parallel to the first taking care to overlap it by a width of a least 10 cm. The overlapping part is linked by means of a chemical compound which fuses the PVC on the surface or by means of a hot air gun that melts and links the overlapping edges, by exploiting the low melting point of the PVC. An inert layer is normally deposited on the PVC layers, having the function of makeweight, in order to allow the attachment of the PVC membrane to the surface. A possible penetration of water, caused by poor junctions, does not remain restricted to the penetration spot and instead spreads under the cover.

BRIEF SUMMARY OF THE INVENTION

In view of the state of the art, it is the object of the present invention to provide a waterproof sheet displaying advantages for the engineering fields as compared to "traditional" products, as e.g. laying rates and ease, lightness, decrease of the critical overlapping spots, motion on the construction site, storage room occupied, and costs.

According to the present invention, said object is achieved by means of a sheet comprising at least one layer of waterproof material arranged between a first and a second layer of spunbonded fabric, characterised in that said layers of spunbonded fabric have a surface covered by waterproof material and are laterally offset one with respect to the other so as to display a projection of the first layer with respect to the second layer on one side and a projection of the second layer with respect to the first layer on the opposite side, in that said at least one layer of waterproof material is comprised of a plastomeric film and in that said projections having waterproof material are visible in order to allow a better adhesion between the sheets.

According to the present invention a process for the manufacturing of a sheet is also provided.

BRIEF DESCRIPTION OF THE DRAWINGS

The features of the present invention will become more apparent from the following description of a practical embodiment, illustrated by way of non-limitative example in the accompanying drawings, in which.

DETAILED DESCRIPTION OF THE INVENTION

With reference to FIGS. 1-5, there is shown a waterproof sheet 1 for buildings according to the present invention.

Figure 1:
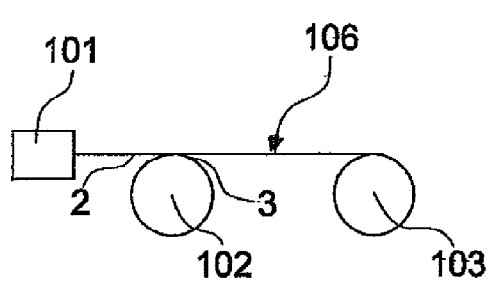
FIG. 1 is a diagrammatic view of a first step of the process for the manufacturing of the waterproof sheet according to the present invention.

Said sheet 1 is manufactured through a first step, in which a plastomeric film 2 is extruded from an extruder 101 on a surface of a layer 3 of spunbonded fabric, for example, made of reinforced polyester, deriving from a roll 102 to form a roll 103 of waterproof spunbonded fabric 106, i.e. with plastomeric film adhering thereto (FIG. 1).

Figure 2:
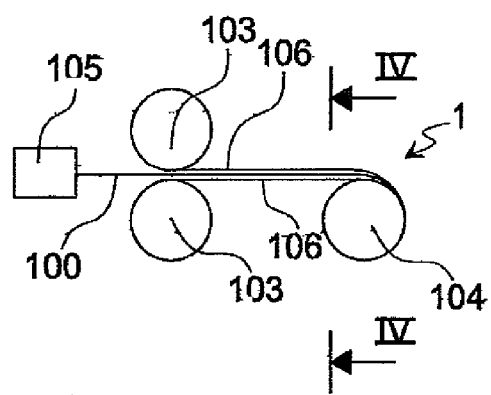
FIG. 2 is a diagrammatic view of a second step of the process for the manufacturing of the waterproof sheet according to the present invention.
Figure 3:
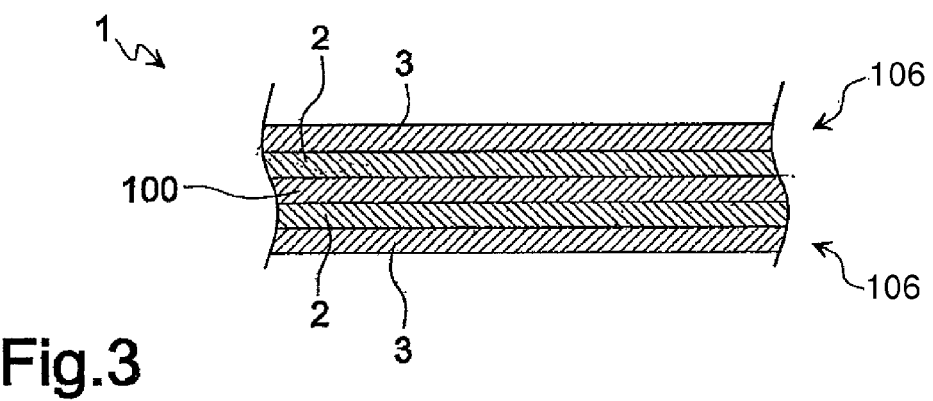
FIG. 3 is a longitudinal section view of the final sheet of FIG. 2.

In a second step of the manufacturing process, two layers of spunbonded fabric 106 deriving from two rolls 103 are coupled one to the other with the interposition of a further plastomeric film 100 deriving from an extruder 105 (for example, the same above-mentioned extruder 101) to form a roll 104 of waterproof sheet 1 (FIG. 2). In this way, the absolute continuity of the waterproof film is guaranteed without the possibility of the occurrence of leaks.

The manufactured sheet (FIG. 3) therefore comprises a waterproof plastomeric film 100, obtained with a polymeric mixture (for example, in our case, comprised of PET=20% and PP=80%), fused with two layers 2 of polymeric mixture, protected by two layers 3 of spunbonded fabric. The insertion of film 100 is carried out in order to avoid leaks from occurring in the waterproof layer and to allow the complete adhesion adapted to form a roll 104 of waterproof sheet. Layers 3 are adapted to serve as a mechanical protection for films 2 and 100 and to also provide an extreme dimensional stability, in particular if they are in turn reinforced with high toughness longitudinal filaments. Layer 100 has an extension greater than each layer 106; layers 106 preferably have an identical extension.

Figure 4:
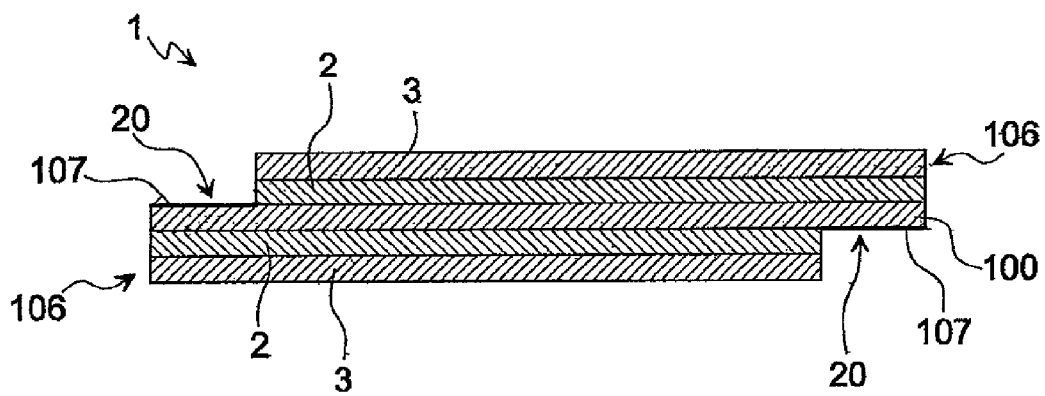
FIG. 4 is a diagrammatic cross-sectional view taken along line IV-IV of the sheet of FIG. 2.

In sheet 1 obtained in this manner, the two layers of spunbonded fabric are laterally offset one with respect to the other, i.e. the side ends of layers 106 are not reciprocally aligned, so as to leave two side portions 20 of layers 106 free, the two side portions being arranged by the sides of the sheet, (FIG. 4). Each side portion 20 extends for the whole length of the sheet and has a suitable width for the adhesion in the application step. The presence of said offset side portions 20 allows the coupling of different sheets 1.

Figure 5:
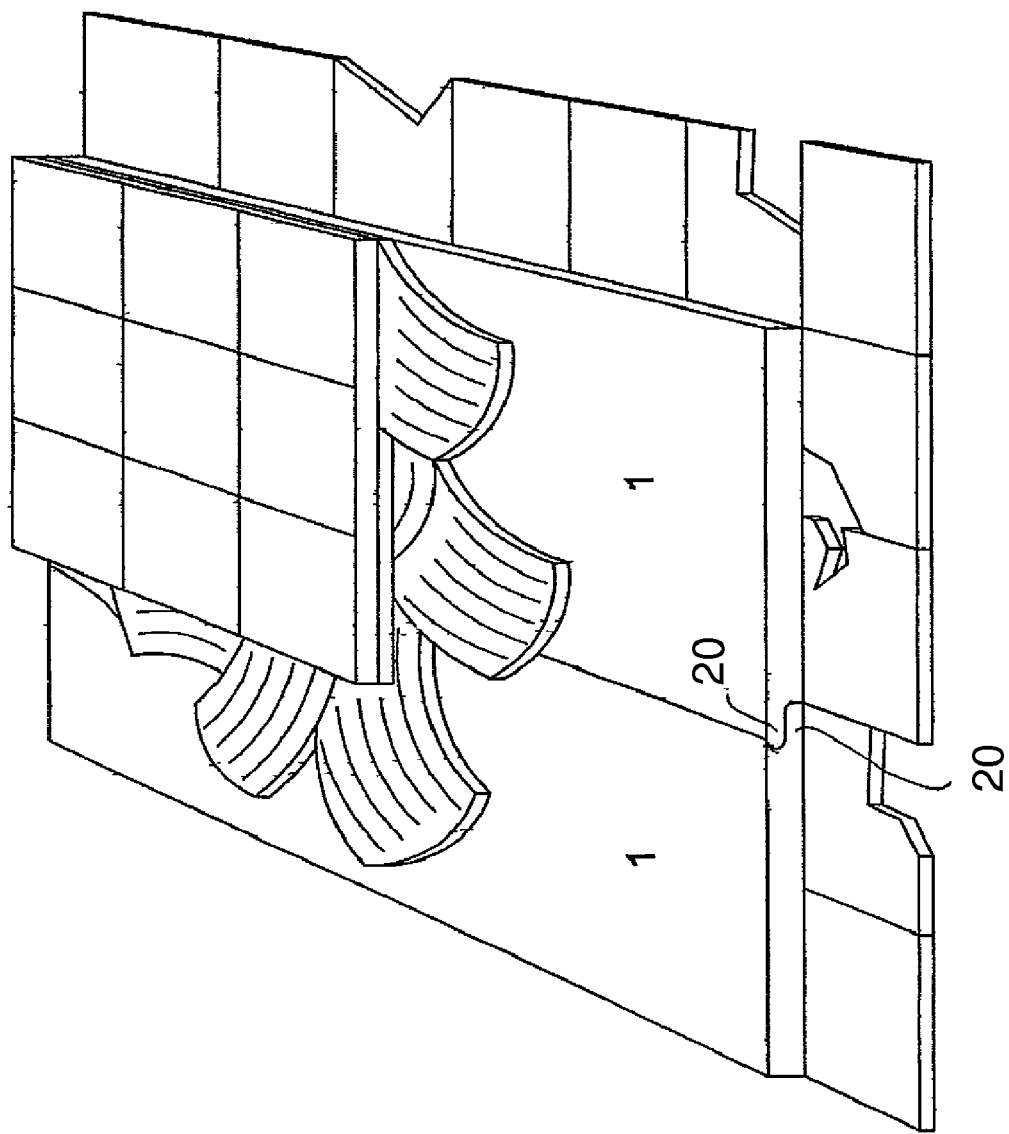
FIG. 5 is a diagrammatic view of a cover formed with the sheet according to the invention.

The laying occurs by unwinding a first roll of sheet 1 on a surface. A second roll of sheet 1 is stretched out parallelly to the first but so that the offset side portions 20 of the two sheets are arranged one on the other taking care to match them (FIG. 5). In this manner, the junction does not occur on the layer on spunbonded fabric, which is always a porous element, but on film 100 instead. The overlapping side portions 20 are linked to one another by means of waterproof butyl-based or acryl-based or other adhesive means 107.

The laying technique does not require the use of special equipment and the laying may also take place in the presence of water.

If it is desired to let sheet 1 adhere to the surface, inert material may be used as makeweight or the surface may be brushed with a bituminous primer (to which the spunbonded fabric is perfectly suited) and then induce sheet 1 to adhere.

Sheet 1 is adapted to protect the surfaces from the penetration of water.

FIG. 5 shows a cover to protect a floor from the penetration of water with sheets 1 according to the invention, before the construction of the new paving.

The invention claimed is:

1. A waterproof sheet comprising:
   a first layer including a first spunbonded fabric and a first waterproof plastomeric film, said first waterproof plastomeric film covering a surface of said first spunbonded fabric;
   a second layer including a second spunbonded fabric and a second waterproof plastomeric film, said second waterproof plastomeric film covering a surface of said second spunbonded fabric; and
   a third waterproof plastomeric film interposed between said first layer and said second layer,
   wherein said first layer is laterally offset from said second layer such that a lateral protrusion of said first layer extends laterally from said second layer on a first side of the waterproof sheet, and such that a lateral protrusion of said second layer extends laterally from said first layer on a second side of the waterproof sheet, said first side of the waterproof sheet being opposite to said second side of the waterproof sheet, and
   wherein said third waterproof plastomeric film is arranged such that a first portion of said third waterproof plastomeric film covers said lateral protrusion of said first layer and a second portion of said third waterproof plastomeric film covers said lateral protrusion of said second layer.

2. The waterproof sheet of claim 1, wherein each of said first spunbonded fabric and said second spunbonded fabric is made of reinforced polyester.

3. The waterproof sheet of claim 1, wherein said third waterproof plastomeric film is made of mixtures of synthetic polymers.

4. The waterproof sheet of claim 3, wherein each of said first spunbonded fabric and said second spunbonded fabric is made of reinforced polyester.

5. The waterproof sheet of claim 1, wherein adhesive material is arranged on each of said first portion of said third waterproof plastomeric film and said second portion of said third waterproof plastomeric film.

6. The waterproof sheet of claim 5, wherein said third waterproof plastomeric film is made of mixtures of synthetic polymers.

7. The waterproof sheet of claim 5, wherein each of said first spunbonded fabric and said second spunbonded fabric is made of reinforced polyester.

8. The waterproof sheet of claim 7, wherein said third waterproof plastomeric film is made of mixtures of synthetic polymers.

9. A waterproof sheet comprising:
   a first layer including a first spunbonded fabric and a first waterproof plastomeric film, said first waterproof plastomeric film covering a surface of said first spunbonded fabric;
   a second layer including a second spunbonded fabric and a second waterproof plastomeric film, said second waterproof plastomeric film covering a surface of said second spunbonded fabric; and
   a third waterproof plastomeric film interposed between said first layer and said second layer,
   wherein said first layer is disposed on said third waterproof plastomeric film such that said first waterproof plastomeric film contacts said third waterproof plastomeric film,
   wherein said second layer is disposed on said third waterproof plastomeric film such that said second waterproof plastomeric film contacts said third waterproof plastomeric film,
   wherein said first layer is laterally offset from said second layer such that a lateral protrusion of said first layer extends laterally from said second layer on a first side of the waterproof sheet, and such that a lateral protrusion of said second layer extends laterally from said first layer on a second side of the waterproof sheet, said first side of the waterproof sheet being opposite to said second side of the waterproof sheet, and
   wherein said third waterproof plastomeric film is arranged such that a first portion of said third waterproof plastomeric film covers said lateral protrusion of said first layer and a second portion of said third waterproof plastomeric film covers said lateral protrusion of said second layer.

10. The waterproof sheet of claim 9, wherein each of said first spunbonded fabric and said second spunbonded fabric is made of reinforced polyester.

11. The waterproof sheet of claim 9, wherein said third waterproof plastomeric film is made of mixtures of synthetic polymers.

12. The waterproof sheet of claim 11, wherein each of said first spunbonded fabric and said second spunbonded fabric is made of reinforced polyester.

13. The waterproof sheet of claim 9, wherein adhesive material is arranged on each of said first portion of said third waterproof plastomeric film and said second portion of said third waterproof plastomeric film.

14. The waterproof sheet of claim 13, wherein said third waterproof plastomeric film is made of mixtures of synthetic polymers.

15. The waterproof sheet of claim 13, wherein each of said first spunbonded fabric and said second spunbonded fabric is made of reinforced polyester.

16. The waterproof sheet of claim 15, wherein said third waterproof plastomeric film is made of mixtures of synthetic polymers.

17. A manufacturing process for producing the waterproof sheet of claim 1, the process comprising:
   extruding a first waterproof plastomeric film on a first layer of spunbonded fabric to obtain a first waterproof spunbonded fabric;
   extruding a second waterproof plastomeric film on a second layer of spunbonded fabric to obtain a second waterproof spunbonded fabric; and
   extruding a third waterproof plastomeric film between said first waterproof spunbonded fabric and said second waterproof spunbonded fabric such that each of the first waterproof plastomeric film and said second waterproof plastomeric film contact said third waterproof plastomeric film.

\* \* \* \* \*